United States Patent
Thomas et al.

(10) Patent No.: US 10,137,615 B2
(45) Date of Patent: Nov. 27, 2018

(54) METHOD FOR FORMING MOTOR VEHICLE SEAT UPHOSLTERY

(71) Applicant: Faurecia Sieges D'Automobile, Nanterre (FR)

(72) Inventors: Julie Thomas, Les Aynans (FR); Fabrice Etienne, Belfort (FR); Robert Lemarchand, Champigny-sur-Marne (FR)

(73) Assignee: Faurecia Sieges D'Automobile, Nanterre (FR)

( * ) Notice: Subject to any disclaimer, the term of this patent is extended or adjusted under 35 U.S.C. 154(b) by 0 days.

(21) Appl. No.: 14/907,950

(22) PCT Filed: Aug. 1, 2014

(86) PCT No.: PCT/FR2014/052011
§ 371 (c)(1),
(2) Date: Jan. 27, 2016

(87) PCT Pub. No.: WO2015/015131
PCT Pub. Date: Feb. 5, 2015

(65) Prior Publication Data
US 2016/0167260 A1 Jun. 16, 2016

(30) Foreign Application Priority Data
Aug. 2, 2013 (FR) .................................. 13 57721

(51) Int. Cl.
*B29C 67/00* (2017.01)
*B29C 43/18* (2006.01)
(Continued)

(52) U.S. Cl.
CPC .......... *B29C 43/183* (2013.01); *B29C 31/008* (2013.01); *B29C 44/14* (2013.01);
(Continued)

(58) Field of Classification Search
CPC ... B29C 43/183; B29C 43/143; B29C 43/184; B29C 63/025; B29C 66/436;
(Continued)

(56) References Cited

U.S. PATENT DOCUMENTS

| | | |
|---|---|---|
| 4,060,280 A | 11/1977 | Van Loo |
| 4,247,346 A | 1/1981 | Maehara et al. |

(Continued)

FOREIGN PATENT DOCUMENTS

| | | |
|---|---|---|
| CN | 1225058 A | 8/1999 |
| CN | 1723312 A | 1/2006 |

(Continued)

OTHER PUBLICATIONS

"International Search Report", issued in International Application No. PCT/FR2014/052011 dated Sep. 22, 2015.
(Continued)

*Primary Examiner* — Stella K Yi
(74) *Attorney, Agent, or Firm* — Kaplan Breyer Schwarz, LLP

(57) ABSTRACT

A method for producing a cover element for upholstery of a motor vehicle seat element, includes at least one layer of foam and a cap made at least from a covering material. The forming of the cover element includes the steps of: placing the cap against a matrix defining the visible shape of the cover element, with the covering material on a side of the matrix; holding the cap pressed against the matrix by suction; placing the at least one layer of foam against a back of the covering material; and applying a forming punch defining a rear face of the cover element.

12 Claims, 4 Drawing Sheets

(51) Int. Cl.
 B29C 44/14 (2006.01)
 B29C 44/56 (2006.01)
 B29D 99/00 (2010.01)
 B60N 2/58 (2006.01)
 B29C 31/00 (2006.01)
 B32B 5/18 (2006.01)
 B32B 27/06 (2006.01)
 B32B 27/32 (2006.01)
 B32B 37/10 (2006.01)
 B32B 37/15 (2006.01)
 B29L 31/58 (2006.01)
 B29L 31/00 (2006.01)
 B29K 105/04 (2006.01)
 B29K 105/00 (2006.01)

(52) U.S. Cl.
 CPC ........ *B29C 44/569* (2013.01); *B29D 99/0092* (2013.01); *B32B 5/18* (2013.01); *B32B 27/065* (2013.01); *B32B 27/32* (2013.01); *B32B 37/10* (2013.01); *B32B 37/15* (2013.01); *B60N 2/5833* (2013.01); *B60N 2/5891* (2013.01); *B29K 2105/04* (2013.01); *B29K 2105/256* (2013.01); *B29K 2623/06* (2013.01); *B29K 2713/00* (2013.01); *B29L 2031/58* (2013.01); *B29L 2031/771* (2013.01); *B32B 2323/04* (2013.01); *B32B 2601/00* (2013.01); *B32B 2605/003* (2013.01)

(58) Field of Classification Search
 CPC ..... B29C 31/008; B29C 44/14; B29C 44/569; B29D 99/0092; B32B 37/10; B60N 2/5891
 See application file for complete search history.

(56) References Cited

U.S. PATENT DOCUMENTS

| | | |
|---|---|---|
| 4,247,347 A | 1/1981 | Lischer et al. |
| 4,247,348 A | 1/1981 | Lischer |
| 4,264,386 A | 4/1981 | Sears, Jr. et al. |
| 4,287,143 A | 9/1981 | Sears, Jr. et al. |
| 4,288,499 A | 9/1981 | Kielbania, Jr. |
| 4,470,857 A | 9/1984 | Casalou |
| 4,772,070 A | 9/1988 | Leto, Jr. et al. |
| 4,792,111 A | 12/1988 | Taguchi |
| 4,795,517 A | 1/1989 | Elliott et al. |
| 4,829,644 A | 5/1989 | Kondo et al. |
| 4,831,697 A | 5/1989 | Urai |
| 4,883,320 A | 11/1989 | Izunida et al. |
| 4,892,891 A | 1/1990 | Close |
| 4,894,277 A | 1/1990 | Akasaki |
| 4,927,209 A | 5/1990 | Maruyama |
| 5,000,805 A | 3/1991 | Lowe |
| 5,283,918 A | 2/1994 | Weingartner et al. |
| 5,462,786 A | 10/1995 | Van Ert |
| 5,477,572 A | 12/1995 | Weingartner et al. |
| 5,632,053 A | 5/1997 | Weingartner et al. |
| 5,669,670 A | 9/1997 | Haraguchi et al. |
| 5,830,548 A | 11/1998 | Andersen et al. |
| 6,004,498 A | 12/1999 | Fujii et al. |
| 6,471,908 B1 | 10/2002 | Beckmann |
| 6,842,950 B2 | 1/2005 | Fleuchaus et al. |
| 6,892,433 B2 | 5/2005 | Barry et al. |
| 7,056,457 B2 | 6/2006 | Senoo |
| 7,481,489 B2 | 1/2009 | Demick |
| 7,487,575 B2 | 2/2009 | Smith |
| 7,823,980 B2 | 11/2010 | Niwa et al. |
| 7,837,263 B2 | 11/2010 | Booth et al. |
| 7,946,649 B2 | 5/2011 | Galbreath et al. |
| 8,099,837 B2 | 1/2012 | Santin et al. |
| 8,191,971 B2 | 6/2012 | Lovasz |
| 8,522,406 B2 | 9/2013 | Voigt |
| 8,647,544 B2 | 2/2014 | Burch |
| 8,794,708 B2 | 8/2014 | Besnard et al. |
| 2002/0101109 A1 | 8/2002 | Stiller et al. |
| 2003/0215601 A1 | 11/2003 | Pedde et al. |
| 2003/0228455 A1 | 12/2003 | Panczyk et al. |
| 2004/0109992 A1 | 6/2004 | Gribble |
| 2005/0006944 A1 | 1/2005 | Ali et al. |
| 2005/0081771 A1 | 4/2005 | Kromm et al. |
| 2006/0141260 A1 | 6/2006 | Haque et al. |
| 2008/0224509 A1 | 9/2008 | Demick |
| 2008/0258523 A1 | 10/2008 | Santin et al. |
| 2008/0309143 A1 | 12/2008 | Booth et al. |
| 2009/0075084 A1 | 3/2009 | Kochi et al. |
| 2009/0085384 A1 | 4/2009 | Galbreath et al. |
| 2009/0295215 A1 | 12/2009 | Galbreath et al. |
| 2009/0302664 A1 | 12/2009 | Galbreath et al. |
| 2010/0041780 A1 | 2/2010 | Friedrich et al. |
| 2011/0059667 A1 | 3/2011 | Meyer et al. |
| 2011/0187176 A1 | 8/2011 | Besnard et al. |
| 2015/0230564 A1 | 8/2015 | Fujisawa et al. |
| 2016/0167260 A1 | 6/2016 | Thomas et al. |
| 2016/0167552 A1 | 6/2016 | Rigal et al. |
| 2016/0304014 A1 | 10/2016 | Lelievre et al. |
| 2016/0368405 A1 | 12/2016 | Ishii et al. |

FOREIGN PATENT DOCUMENTS

| | | |
|---|---|---|
| EP | 0387230 A1 | 9/1990 |
| EP | 0396305 A2 | 11/1990 |
| EP | 0618169 A2 | 10/1994 |
| FR | 2785580 A1 | 5/2000 |
| FR | 2939731 A1 | 6/2010 |
| FR | 2941657 A1 | 8/2010 |
| FR | 2939731 A1 | 6/2018 |
| GB | 2006667 A | 5/1979 |
| GB | 2343408 A | 5/2000 |
| JP | 2010214997 | 9/2010 |
| WO | 9114566 A1 | 10/1991 |
| WO | 98/02331 A1 | 1/1998 |
| WO | 2010010281 A2 | 1/2010 |
| WO | 20150015132 A2 | 2/2015 |

OTHER PUBLICATIONS

"International Search Report and Written Opinion of the International Searching Authority", dated Jan. 22, 2015, International Application PCT/FR2014/052012, 11 pp.
"French Search Report", dated Feb. 25, 2016, French Patent Application No. FR1553404, 2 pp.
"Office Action", U.S. Appl. No. 13/055,510, filed Apr. 11, 2011, dated Jun. 13, 2013, 9 pp.
"Office Action", U.S. Appl. No. 13/055,510, filed Apr. 11, 2011, dated Jul. 26, 2013, 13 pp.
"Office Action", U.S. Appl. No. 13/055,510, filed Apr. 11, 2011, dated Dec. 18, 2013, 10 pp.
"Notice of Allowance", U.S. Appl. No. 13/055,510, filed Apr. 11, 2011, dated Mar. 31, 2014, dated Mar. 31, 2014, 8 pp.
Officer Beate Giffo-Schmitt, "International Preliminary Report on Patentability", International Patent Application PCT/FR2009/051434, dated Mar. 1, 2011, 8 pp.
Officer David Molenaar, "International Search Report and Written Opinion", International Patent Application PCT/FR2009/052011, dated Sep. 22, 2014, 10 pp.
Officer Jean Lanaspeze, "International Search Report", International Patent Application PCT/FR2009/051434, dated Jan. 25, 2010, 6 pp.
"Non-Final Office Action", U.S. Appl. No. 15/099,329 dated Aug. 18, 2017, 5 pp.
Officer David Molenaar, "International Search Report and Written Opinion", International Patent Application PCT/FR2014/052011, dated Sep. 22, 2014, 10 pp.
"Non Final Office Action", Related U.S. Appl. No. 14/908,247 dated Mar. 21, 2018, 9 pp.
"Restriction Requirement" issued in related U.S. Appl. No. 14/908,247 dated Dec. 20, 2017.

(56) References Cited

OTHER PUBLICATIONS

"Final Office Action" issued in related U.S. Appl. No. 15/099,329 dated Dec. 20, 2017.
"Notice of Allowance" dated Mar. 29, 2018 issued in U.S. Appl. No. 15/099,329.
Final Office Action received for U.S. Appl. No. 14/908,247, dated Aug. 13, 2018, 07 pages.

… (1) …

METHOD FOR FORMING MOTOR VEHICLE SEAT UPHOSLTERY

The present patent application claims the priority benefit of French patent application FR13/57721 which is herein incorporated by reference.

BACKGROUND

The present disclosure generally relates to motor vehicle seats and, more specifically, to the forming of upholstery for a seat element (seat bottom piece, backrest, headrest, armrests).

DISCUSSION OF THE RELATED ART

It has already been provided, for example, in document WO-A-2010/010281, to form upholstery for a motor vehicle seat in the form of a foam support block adapted to a frame element of the seat having a cover element formed by cold forming of foam sprayed onto a polypropylene substrate and placed on the reverse side of a textile material, of skin or of a synthetic material, to define the visible shape of the seat element.

SUMMARY

An embodiment aims at improving the forming of upholstery for motor vehicle seats.

An embodiment aims at providing a method of forming upholstery for a motor vehicle seat element.

An embodiment aims at providing a solution improving the aspect of the cover element.

An embodiment aims at providing a solution particularly adapted to a skin covering, for example, of leather type.

Thus, an embodiment provides a method of forming a cover element of upholstery of an element of a motor vehicle seat, comprising at least one layer of foam and a cap made at least of a covering material, wherein the forming of the cover element comprises the steps of:

placing said cap against a matrix defining the visible shape of the cover element, with the covering material on the matrix side;

maintaining the cap pressed against the matrix by suction;

placing said foam layer against the back of said covering material; and applying a forming punch defining a rear surface of the cover element.

According to an embodiment, said foam layer is obtained by spraying foam on a substrate supported by a suction plate.

According to an embodiment, said substrate is a polyethylene film.

According to an embodiment, said substrate comprises a slit foam layer.

According to an embodiment, said substrate comprises a woven or nonwoven textile.

According to an embodiment, the cap has a permeability to air smaller than 300 liters/m² per second.

According to an embodiment, the cap comprises said covering material and a barrier layer, preferably made of polyurethane.

According to an embodiment, the covering material is assembled with the barrier layer by sewing along style feature lines.

According to an embodiment, the covering material is skin.

According to an embodiment, the thickness of the cover element is in the range from 5 to 40 mm.

According to an embodiment, elements for attaching the covering element to the support block are embedded in the foam layer.

An embodiment also provides a cover element for motor vehicle seat upholstery.

An embodiment also provides motor vehicle seat upholstery comprising a foam support block and a cover element.

An embodiment also provides a motor vehicle seat comprising at least one piece of upholstery.

BRIEF DESCRIPTION OF THE DRAWINGS

The foregoing and other features and advantages of the present invention will be discussed in detail in the following non-limiting description of specific embodiments in connection with the accompanying drawings, among which.

DETAILED DESCRIPTION

Figure 1:
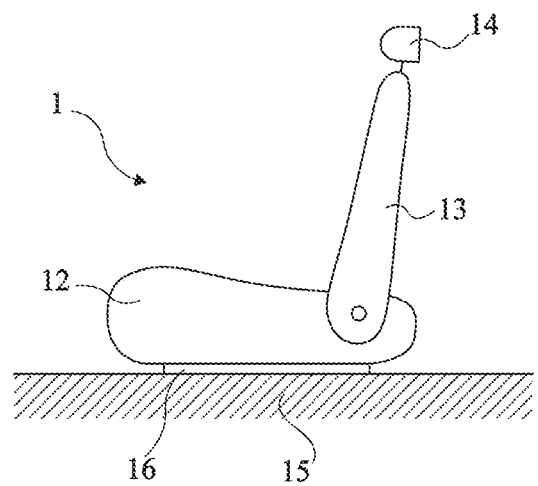
FIG. 1 is a simplified lateral view of a motor vehicle seat.

The same elements have been designated with the same reference numerals in the different drawings, which have been drawn out of scale. For clarity, only those steps and elements which are useful to the understanding of the present invention have been shown and will be described. In particular, the forming of other seat portions than the upholstery has not been detailed, the invention being compatible with any usual forming of upholstery placed on a frame.

In the following description, when reference is made to terms qualifying absolute positions such as "front", "rear", "top", "bottom", "left", "right", etc., or relative positions, such as "above", "under", "upper", "lower", etc., or to terms qualifying directions, it is referred to a seat in a normal position of use in the usual vehicle motion direction. Unless otherwise specified, expressions approximately, substantially, and in the order of mean to within 10%.

FIG. 1 is a simplified lateral view of a motor vehicle seat 1.

Such a seat comprises a seat bottom piece 12 having a backrest 13, most often topped with a headrest 14, jointed thereto. Seat bottom piece 12, backrest 13, and headrest 14 each comprise upholstery fastened to their frame, generally made of metal. Frame 16 of seat bottom piece 12 may be connected to floor 15 of the vehicle by a slide rail mechanism. Seat 1 may also comprise one or several armrests (not shown).

Motor vehicle seat upholstery generally appears in the form of a padding coated with a cap comprising, at the lower surface (not shown), a foam thickness under the cover material (made of textile material, of skin, of a synthetic material, etc.).

Figure 2A:
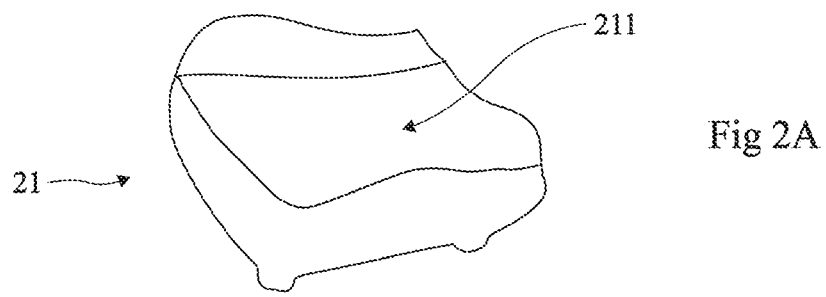
FIGS. 2A, 2B, and 2C are perspective views of upholstery of a seat element.
Figure 2B:
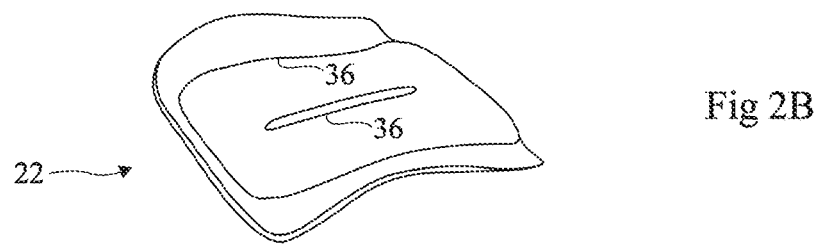
Figure 2C:
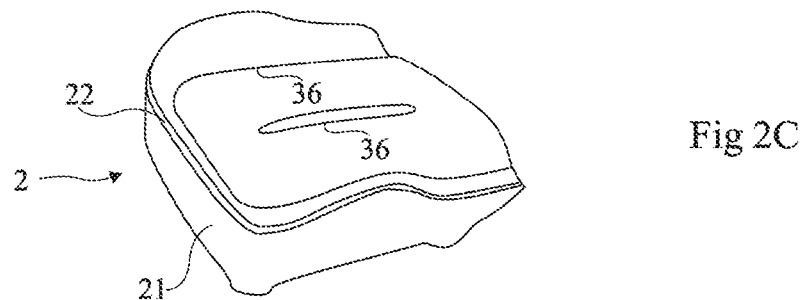

FIGS. 2A, 2B, and 2C are perspective views illustrating the forming of upholstery of a seat element (for example, of seat bottom piece 12).

A foam support block 21 (FIG. 2A) is formed with no style feature, and upper surface 211 of the foam block does not define the final visible shape of the seat bottom piece.

Support block 21 is intended to receive a cover element 22 (FIG. 2B) defining the final shape (imitating style feature lines 36) of the seat element.

Cover element 22 is intended to be placed (FIG. 2C) on block 21 to obtain the final upholstery of element 12. The fastening of element 22 to block 21 is performed, for example, by self-adhesive bands (not shown) applied by gluing or overmolding at the surface of elements 22 and 21, which eases the replacing of the cover element in case it is worn off or defective. As a variation, element 22 is glued or snapped to block 21 or simply maintained in position by the upholstery stretching forces.

Lateral tucked panels or skirts (not shown in FIGS. 2A to 2C) taking part in the holding of element 22 on block 21 may also be provided. Such tucked panels are generally sewn to the edges of element 22.

Figure 3:
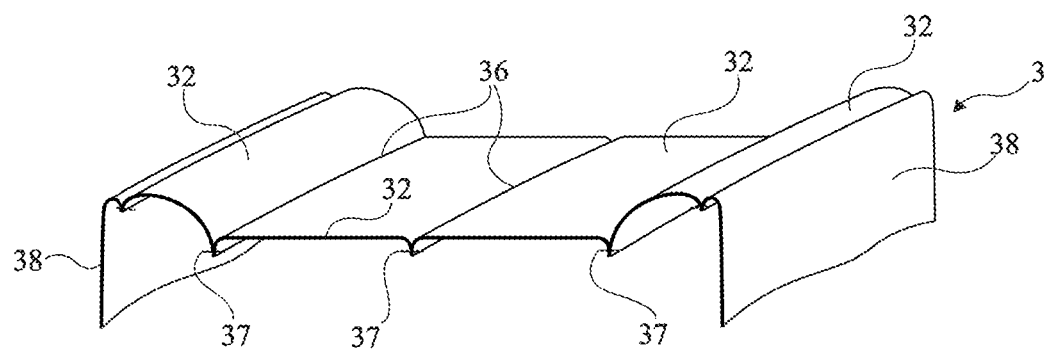
FIG. 3 is a simplified representation of an example of a cap.

FIG. 3 is a perspective cross-section view of an embodiment of a cap 3, intended to form part of cover element 22.

It is started by forming an apparent layer (cover material) of cap 3 in the form of a covering 32 made of textile, plastic-coated textile (vinyl), leather, split leather, various skins, or any other type of covering capable of forming the apparent surface of seat upholstery. As an example, pieces of covering material 32 (for example, leather pieces) are assembled by sewing 37 along style feature lines 36. In the example of FIG. 3, optional lateral tucked panels or skirts 38 are provided.

Figure 4:
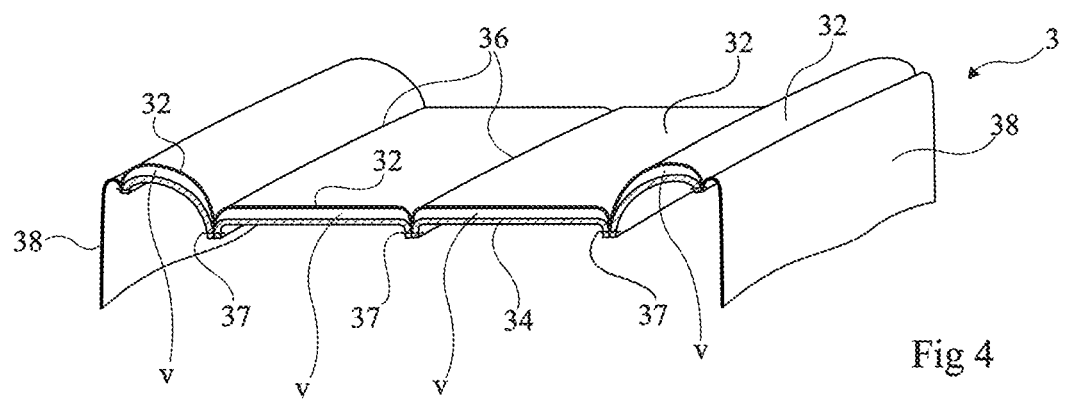
FIG. 4 is a simplified representation of another example of a cap.

FIG. 4 is a simplified representation of another embodiment of a cap 3.

According to this embodiment, a layer 34, forming, in a way, a barrier and which is assembled to covering 32 for example by gluing, by peripheral sewing of covering pieces 32, by flame treatment, etc., are provided.

Preferably, particularly for a skin covering 32, layer 34 is assembled only at the periphery of the skin pieces (at the level of style feature lines 36) so that skin 32 does not adhere to layer 34, which improves the aspect and the comfort. In FIG. 4, this phenomenon has been exaggerated by showing a space "v" free of material between covering 32 and layer 34, outside of seams 37. In practice, covering 32 is not simply fastened to layer 34 outside of the seams.

Another function of layer 34, which will better appear from the description of the subsequent drawings, is to avoid for the foam which will be deposited (sprayed) at the rear surface of the cap to adhere to covering material 32, which preserves the flexibility and the feel of the covering material.

Cap 3, preferably including a barrier layer 34, has the feature of having a limited permeability to air (smaller than 300 liters per m² and per second under a 100-Pa pressure). Layer 34 is provided, for example, if covering 32 is too permeable.

As a specific example, layer 34 may be slit polyurethane foam, having a thickness between approximately 1 mm and 20 mm and having a density in the range from 20 to 70 kg/m³. A polyurethane film having a thickness between 15 microns and 80 microns, microperforated or not, may also be used.

In the presence of lateral tucked panels 38, said panels preferably comprise no barrier layer 34, as illustrated in FIG. 4.

The mechanical resistance of barrier layer 34 and/or of covering 32 may be improved by means of a knitted or woven textile grid (not shown) having a relatively low weight per unit area (for example, between 20 and 150 g/m²).

The function of the low permeability to air of cap 3 thus formed is to allow an accurate positioning of the cover in a mold matrix at the next manufacturing steps. A shifting out of its position of the cap during the pressing which follows its installation in the mold is thus avoided.

Figure 5A:
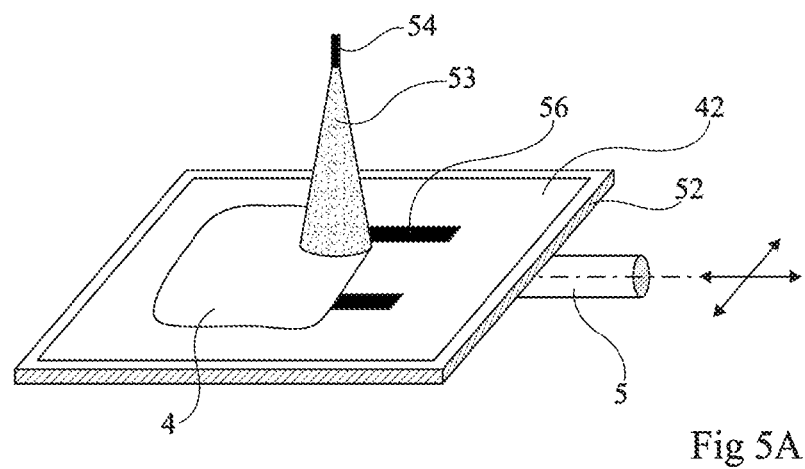
FIGS. 5A, 5B, and 5C are perspective cross-section views illustrating an embodiment of a cover element.
Figure 5B:
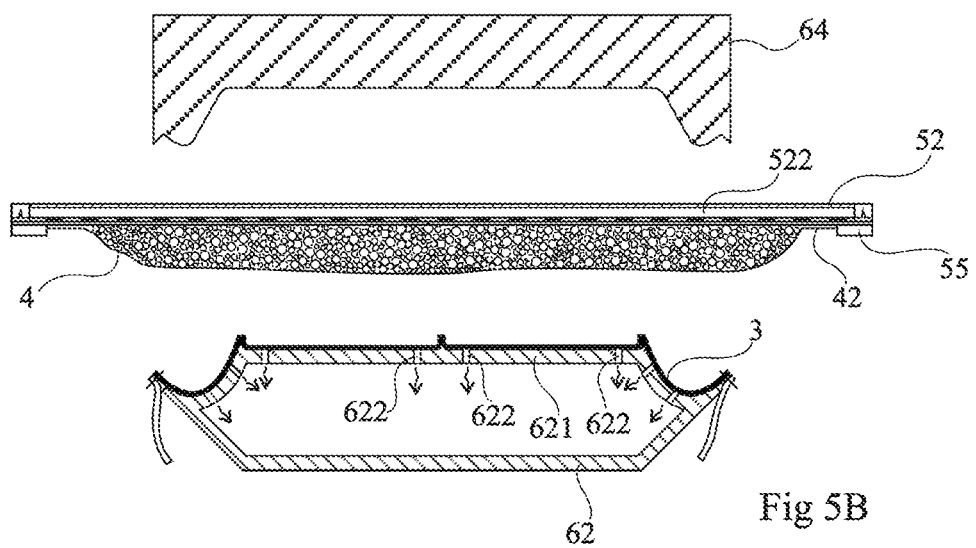
Figure 5C:
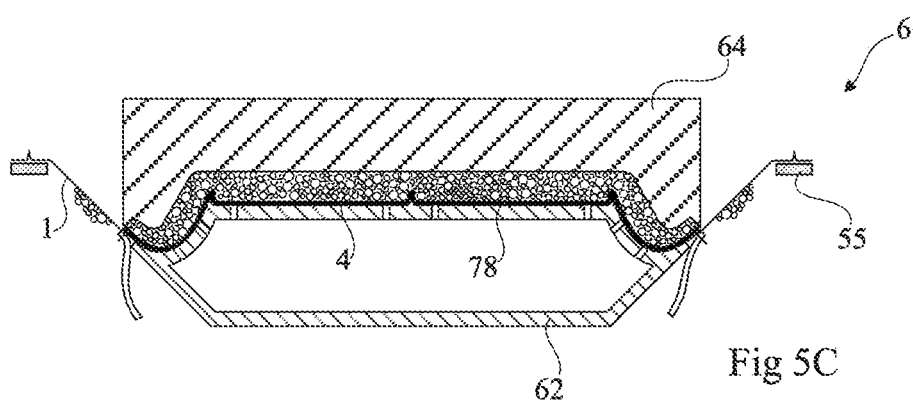

FIGS. 5A, 5B, and 5C are views, respectively in perspective for FIG. 5A and in cross-section for FIGS. 5B and 5C, illustrating steps of the forming of cover element 22 from a cap 3.

A substrate 42, for example, made of a polyethylene film, of a slit foam layer, of a woven or nonwoven textile, or of a stack of a plurality of these components, is placed on a suction plate 52 and is held in place by suction (symbolized by a suction arm 5 of a robotized element of the installation). Different embodiments of the substrate will be illustrated hereafter.

In this embodiment illustrated in FIG. 5A, it is provided to position, against substrate 42 and before spraying a foam layer 4, catching elements, for example, hook-and-loop straps 56 intended to subsequently cooperate with the support block to fasten the cover element. Foam 53 is sprayed (spray head 54) on a surface of substrate 42.

As illustrated in FIG. 5B, cap 3, resulting from the embodiment illustrated in FIG. 3 or FIG. 4, is positioned against a first portion or matrix 62 of a mold for forming the cover element. Matrix 62 defines, by its surface or upper plate 621, the final shape desired for cover element 22 and has the specificity of applying a suction (openings 622). Thus, cap 3 takes the shape of upper portion 621 of matrix 62 due to the suction, the cap being positioned with its visible surface (skin or textile) against plate 621. A peripheral holding (not shown) of cap 3 may be provided at the level of matrix 62, but preferably with no tension.

Plate 52 supporting, on substrate 42, layer 4 of sprayed foam is then placed, with foam 4 on the side of cap 3, against matrix 62. Then, plate 52 is removed and a punch 64 closes the mold (FIG. 5C).

FIG. 5B illustrates the presence of suction channels 522 at the level of plate 52. In practice, when the plate is flipped before its transfer onto matrix 62, substrate 42 is pinched at the periphery by means of a frame 55, which eases handling operations. Once the plate has been flipped and positioned vertically above matrix 62, the suction is stopped, so that substrate 42 is no longer held. Thus, the assembly formed of substrate 42 and foam 4 is laid on matrix 62. Plate 52 is then removed and punch 64 may close the mold.

On closing of the mold (FIG. 5C), foam 4 is compressed by means of punch 64. In practice, the foam is compressed before being dried, that is, while it is in its sticky phase. According to the nature of the foam, this pressing is performed between approximately 15 seconds and 60 seconds after the end of the spraying. The time period for which mold 6 remains closed depends on the time period necessary to dry the foam. Typically, this time period is in the range from 50 to 90 seconds to be able to easily unmold the part.

Once the cover element has been unmolded, polyethylene film 42 is preferably removed, particularly to make optional strips 56 accessible, before placing cover element 22 on support block 21.

The shape of punch 64 defines the surface of the cover element, intended to bear against the support block (21, FIG. 2A). Thus, matrix 62 defines the visible surface of cover element 22 while punch 64 defines the rear surface thereof. The space between matrix 62 and punch 64 defines the final thickness of cover element 22 and, in particular, of its foam layer 4.

Figure 6:
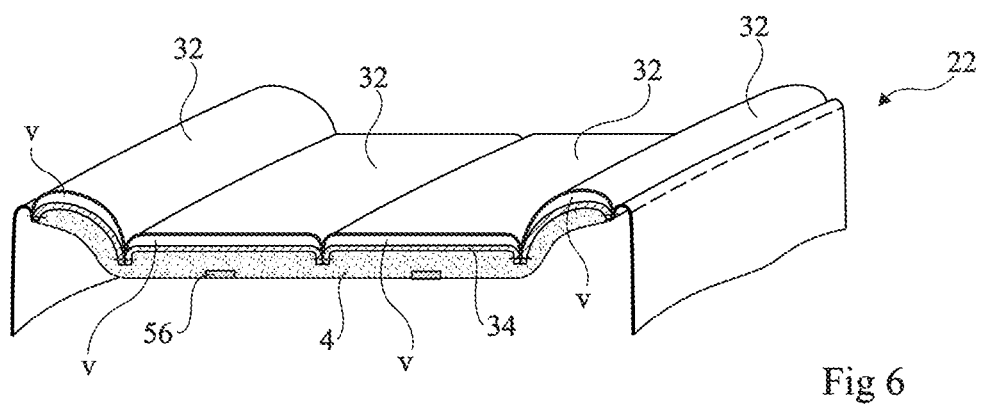
FIG. 6 is a perspective cross-section view of an embodiment of a cover element obtained by the implementation of the method of FIGS. 5A to 5C.

FIG. 6 illustrates, in a perspective cross-section view, an example of a cover element 22 obtained after coming out of mold 6 of FIG. 5C.

This embodiment takes the example of cap 3 of FIG. 4 (presence of a barrier layer 34) and illustrates the presence of hook-and-loop straps 56 at the rear surface of the cover element.

Once this cover element has been obtained, it is associated with a support block which may for example be formed as described in above-mentioned document WO-A-2010/010281.

Figure 7:
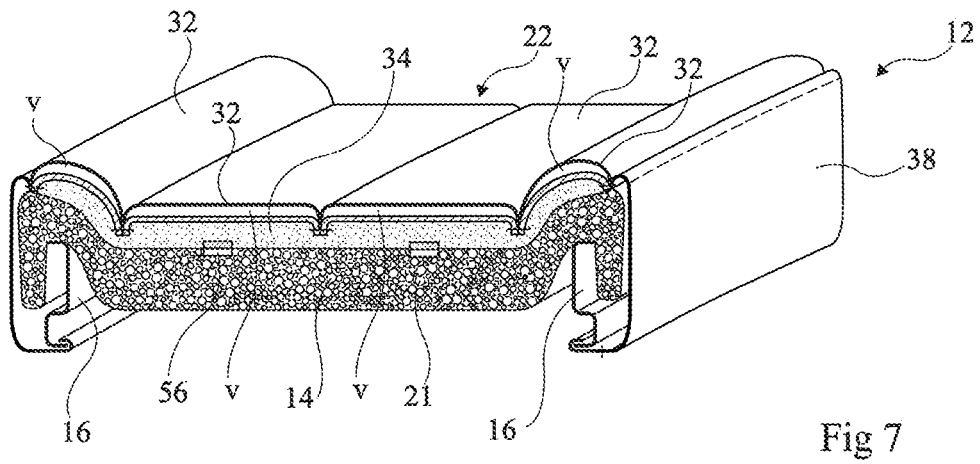
FIG. 7 is a perspective cross-section view of seat upholstery obtained with the cover element of FIG. 6.

FIG. 7 is a simplified perspective view of a seat bottom piece 12 provided with cover element 22 of FIG. 6, at the end of its manufacturing.

The seating cushion, formed of support block 21 and of cover element 22, is shown to be assembled on a slide rail mechanism 16. Lateral tucked panels 38 cover, preferably with the covering material, the edges of the seat bottom piece.

An advantage of the described embodiments is that the foam thickness may be different according to the areas of the padding, the thickness adaptation being performed by means of mold 6. As a specific embodiment, the foam may have a thickness in the range from 5 to 40 mm according to regions.

Various embodiments have been described. Various alterations and modifications will occur to those skilled in the art. In particular, although the embodiments have been described in relation with an example of upholstery for a seat bottom piece, they more generally apply to any seat element. Further, the distribution between the thickness provided to foam support block 21 and that of cover element 22 may vary according to seat ranges. Further, the practical implementation of the described embodiments is within the abilities of those skilled in the art based on the functional indications given hereabove.

The invention claimed is:

1. A method of forming a cover element for upholstery of an element of a motor vehicle seat, comprising at least one layer of foam and a cap comprising at least a covering material, wherein the forming of the cover element comprises the steps of:
placing said cap against a matrix defining the visible shape of the cover element, with the covering material on a side of the matrix;
maintaining the cap pressed against the matrix by suction;
placing said at least one layer of foam against a back of said covering material; and
applying a forming punch defining a rear surface of the cover element;
wherein a foam thickness of the at least one layer of foam is obtained by spraying foam on a substrate supported by a suction plate.

2. The method of claim 1, wherein said substrate is a polyethylene film.

3. The method of claim 1, wherein said substrate comprises a slit foam layer.

4. The method of claim 1, wherein said substrate comprises a woven or nonwoven textile.

5. The method of claim 1, wherein the cap has a permeability to air smaller than 300 liters/m$^2$ per second.

6. The method of claim 1, wherein the cap further comprises a barrier layer made of polyurethane.

7. The method of claim 6, wherein the covering material is assembled with the barrier layer by sewing along style feature lines.

8. The method of claim 1, wherein the covering material is skin.

9. The method of claim 1, wherein a thickness of the cover element is in the range from 5 to 40 mm.

10. The method of claim 1, wherein elements for fastening the cover element to a support block are embedded in the at least one layer of foam.

11. A method of forming a cover element for upholstery of an element of a motor vehicle seat, comprising at least one layer of foam and a cap comprising at least a covering material, wherein the forming of the cover element comprises the steps of:
placing said cap against a matrix defining the visible shape of the cover element, with the covering material on a side of the matrix;
maintaining the cap pressed against the matrix by suction;
placing said at least one layer of foam against a back of said covering material; and
applying a forming punch defining a rear surface of the cover element;
wherein the cap has a permeability to air smaller than 300 liters/m$^2$ per second.

12. A method of forming a cover element for upholstery of an element of a motor vehicle seat, comprising at least one layer of foam and a cap comprising at least a covering material, wherein the forming of the cover element comprises the steps of:
placing said cap against a matrix defining the visible shape of the cover element, with the covering material on a side of the matrix;
maintaining the cap pressed against the matrix by suction;
placing said at least one layer of foam against a back of said covering material; and
applying a forming punch defining a rear surface of the cover element;
wherein the cap further comprises a barrier layer made of polyurethane.

\* \* \* \* \*